United States Patent [19]

Tada et al.

[11] Patent Number: 4,726,664
[45] Date of Patent: Feb. 23, 1988

[54] ELECTROCHROMIC DEVICE

[75] Inventors: Hiroaki Tada; Hirotsugu Nagayama, both of Nishinomiya; Hideo Kawahara, Toyonaka, all of Japan

[73] Assignee: Nippon Sheet Glass Co., Ltd., Osaka, Japan

[21] Appl. No.: 843,002

[22] Filed: Mar. 24, 1986

[30] Foreign Application Priority Data

Mar. 25, 1985 [JP] Japan ................................. 60-60278

[51] Int. Cl.$^4$ ............................ G03G 5/02; G02B 1/00
[52] U.S. Cl. .................................... 350/357; 252/600; 252/582
[58] Field of Search ................. 252/600, 582; 350/357

[56] References Cited

U.S. PATENT DOCUMENTS

| 3,941,849 | 3/1976 | Herold | 260/607 A |
|---|---|---|---|
| 4,182,551 | 1/1980 | Washida et al. | 350/357 |
| 4,211,475 | 7/1980 | Malugani et al. | 252/600 X |
| 4,338,000 | 7/1982 | Kamimori et al. | 252/600 |
| 4,390,246 | 6/1983 | Miyoshi | 350/357 |
| 4,411,497 | 10/1983 | Yamanaka et al. | 350/357 |
| 4,451,348 | 5/1984 | Itaya et al. | 350/357 X |
| 4,465,339 | 8/1984 | Baucke et al. | 252/600 |
| 4,513,302 | 4/1985 | Braun | 346/210 |
| 4,645,307 | 2/1987 | Miyamoto et al. | 350/357 |
| 4,652,090 | 3/1987 | Uchikawa et al. | 350/357 |

FOREIGN PATENT DOCUMENTS

| 48994 | 4/1976 | Japan | 252/600 |
|---|---|---|---|
| 11177 | 2/1978 | Japan | 252/600 |
| 4679 | 1/1981 | Japan . | |
| 154425 | 9/1984 | Japan | 252/600 |
| 155833 | 9/1984 | Japan . | |

Primary Examiner—Richard D. Lovering
Assistant Examiner—Catherine S. Kilby
Attorney, Agent, or Firm—Finnegan, Henderson, Farabow, Garrett & Dunner

[57] ABSTRACT

An electrochromic device comprising an oxidation coloring substance coloring in an oxidized state and a reduction coloring substance coloring in a reduced state which are formed on the surfaces of a pair of electrodes, respectively, and an electrolyte held between the two substances, wherein the oxidation coloring substance is a double salt containing an iron hexacyanoferrate and the reduction coloring substance is a tungsten-oxalic acid compound. The electrochromic device has a long life suitable for actual applications and a short response time and can operate at low applied voltages.

3 Claims, 8 Drawing Figures

ELECTROCHROMIC DEVICE

BACKGROUND OF THE INVENTION

1. Field of the Invention

The present invention relates to an electrochromic device (hereinafter referred to as ECD) and, more particularly, it relates to a transparent ECD having a short response time.

2. Description of the Prior Art

Today, display materials are enjoying widespread use in a wide range of applications, including television sets, watches, and measuring instruments. However, there has been a growing need for lightweight, low-profile, and large-area display devices due to the spread of terminal units in information processing and the technological advances in car electronics. Along with this, ECDs which have a low dependence on visual angle, a memory function and a relatively large display area have been receiving a lot of attention. However, ECDs which have become available to date have long response times and provide unsatisfactory reversibility, and therefore, have not been put into practical use.

Another promising application for ECDs is in large transparent electrochromic devices. Some liquid-crystal transparent electrochromic devices have been manufactured as test samples. However, currently available liquid crystals have drawbacks that the weatherability of polarizing films is unsatisfactory and the gap between the substrates must be kept constant. For this reason, the liquid-crystals have not been put into practical use in the dimmer devices.

A transparent ECD of a so-called oxidation-reduction complementary type combining a reduction coloring EC film and an oxidation coloring electrochromic film (hereinafter referred to as EC film) has also been proposed, as in Japanese Patent Application Laid-open Nos. 4679/1981, 114021/1983, and 139128/1983.

However, the transparent ECDs of the oxidation-reduction complementary type which have become available so far have different color tones in the two EC films. Therefore, the color quality is lowered, or a low coloring efficiency of one of the two films results in a poor additive effect of coloration.

Another ECD for coloring in hues of similar tones is also known, as disclosed in Japanese Patent Application Laid-open No. 59-155833. In accordance with the technique disclosed there, an ECD comprises an oxidation coloring substance coloring in an oxidized state and a reduction coloring substance coloring in a reduced state which are formed on the surfaces of a pair of electrodes, respectively, and an electrolyte held between the two substances, wherein the oxidation coloring substance is a double salt containing an iron hexacyanoferrate, and the reduction coloring substance is an oxide of a transition metal.

The above-mentioned prior art ECD requires lithium ion or proton as an ion species of an electrolyte for coloring/bleaching since the ECD uses, as a reduction coloring substance, a film of a transition metal oxide formed by chemical vapour deposition, such as a $WO_3$ film and an $MoO_3$ film. However, the lithium ion or proton significantly reduces the life of the iron hexacyanoferrate (generally called "Prussian blue"; hereinafter referred to as PB) which is used as the oxidation coloring substance on the counter electrode (for example, Japanese Patent Application Laid-open No. 98380/1983). Therefore, conventional ECDs described above did not have use life sufficient for practical applications and have been unsuitable for industrial production.

SUMMARY OF THE INVENTION

It is an object of the present invention to provide an oxidation-reduction complementary type transparent ECD which has a use life suitable for actual application, and which has a short response time, good reversibility, and matched color tones.

In order to achieve the above object of the present invention, the present invention provides an ECD comprising an oxidation coloring substance coloring in an oxidized state and a reduction coloring substance coloring in a reduced state which are formed on the surfaces of a pair of electrodes, respectively, and an electrolyte held between the two substances, wherein the oxidation coloring substance is a double salt containing an iron hexacyanoferrate and the reduction coloring substance is a tungsten-oxalic acid compound.

The ECDs of the present invention use films of the tungsten-oxalic acid compounds as reduction coloring substances. Therefore, reduction and oxidation coloring can be performed simultaneously without using protons and/or lithium ions which adversely affect durability of the Prussian blue film. The ECDs of the present invention are also ECDs which can operate at low applied voltage, such as 0.5 V.

A method of forming EC films for the ECD according to the present invention, i.e., the deposition method (electrolytic deposition method) can form with ease films of a larger area than the vacuum method (vacuum deposition method) or the like. In view of this, the ECDs of the present invention can widely be used in displays and large transparent electrochromic devices.

DETAILED DESCRIPTION OF THE PREFERRED EMBODIMENT

Figure 1:
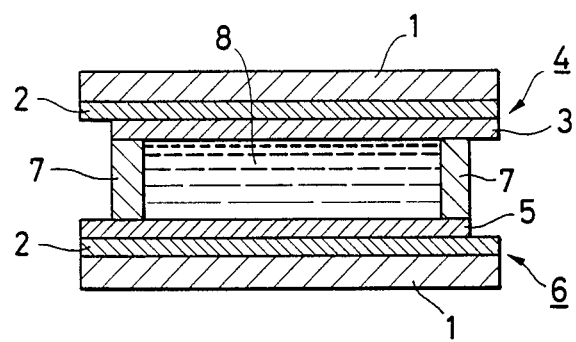
FIG. 1 is a sectional view illustrating the ECD according to the present invention.

For the electrodes to be used according to the present invention, common electrode materials may be used. However, in order to make a transparent ECD, a transparent material with a transparent conductive coating is preferred.

The iron hexacyanoferrates which show coloration in the oxidized state include:

A. substances having the following empirical formula in the ground state:

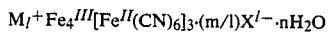

$$M_l{}^+Fe_4{}^{III}[Fe^{II}(CN)_6]_3 \cdot (m/l)X^{l-} \cdot nH_2O$$

B. substances having the following empirical formula in the reduced state:

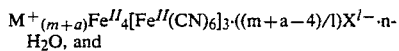

C. substances having the following empirical formula in the oxidized state:

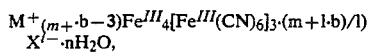

in which M+ is a cation having a valence of one (potassium ion, rubidium ion, cesium ion or ammonium ion); $X^{l-}$ is an anion having a valence of l, and l is 1 or 2 (l=1, $X^-=Cl^-$, $NO_3^-$, $ClO_4^-$, $BF_4^-$, or $BF_6^-$; or l=2, $X^{--}=SO_4^{--}$ or $CO_3^{--}$); m is 0 or a positive integer of up to 5; n is 0 or a positive number; and a and b are positive numbers and satisfy all of the following inequalities:

$$0 \leq (l+1)m \leq 8 \, l$$

$$0 \leq (l+1)(m+a)-4 \leq 8 \, l$$

$$0 \leq m+a-4$$

$$0 \leq (l+1)(m+l \cdot b)-3 \, l \leq 8 \, l$$

$$0 \leq m+l \cdot b-3$$

A thin film of the iron hexacyanoferrate can be formed by dipping a substrate and a counter electrode in a solution containing Fe(III) ions and [Fe(III)(CN)$_6$]$^{3-}$ ions and subsequent electrolysis using the substrate as a cathode (japanese Patent Application Laid-open No. 120222/1983).

For tungsten-oxalic acid compounds used as reduction coloring substances may be used tungsten-oxalic acid compounds having various empirical formulas. Preferably, the tungstenoxalic acid compounds containing oxalic acid coordinating with tungsten, in an amount of 0.172 to 0.48 times, and more preferably, 0.276 to 0.48 times the weight of the tungsten in said compounds, are used.

The tungsten-oxalic acid compounds as described above can be prepared by electrolytic reduction of acidic solutions containing the transition metal ions and aliphatic carboxylate ions, dipping substrates in the solutions, and allowing the resulting transition metal-oxalic acid compounds to deposit on the surface of the substrates, that is, by the deposition method.

The tungsten-oxalic acid compounds prepared by the deposition method are the compounds wherein the weight of oxalic acid coordinating with tungsten is 0.48 times that of the tungsten in the compounds.

The films of the tungsten-oxalic acid compounds prepared by the deposition method contain tungsten, oxalic acid coordinating with tungsten, and trace amounts of metal ions such as alkali metal ions contained in the electrolytic reducing solutions. The oxalic acid present in the deposited films in considered to be almost entirely coordinating with tungsten.

When the deposited films prepared in this manner are burned, the coordinating oxalic acid is dissociated and scattered, and films having a smaller ratio of oxalic acid are obtained. The composition of the resultant films are almost completely controlled by the burning temperature.

When the deposited film is burned at 200° C., the resultant film contains oxalic acid coordinating with tungsten, in an amount of 0.276 times the weight of tungsten in the burned film. When the deposited film is burned at 280° C., the resultant film contains oxalic acid coordinating with tungsten, in an amount of 0.172 times the weight of tungsten in the burned film.

When the deposited films are burned at temperatures higher than 280° C., the resultant films contain oxalic acid coordinating with tungsten, in an amount up to 0.172 times the weight of tungsten in the burned films, and it becomes difficult for these burned films to exhibit coloring/bleaching properties when electrolytes (K+, Rb+, Cs+NH$_4$+, and the like) harmless to the PB films are used.

The tungsten-oxalic acid compounds as described above can exhibit coloring/bleaching properties, even when electrolytes (K+, Rb+, Cs+, HN$_4$+, and the like) harmless to the PB films are used. Therefore, the electrolytes containing the above ions, such as RCl, RNO$_3$, RClO$_4$, R$_2$SO$_4$, or R$_2$CO$_3$ (R=K, Rb, Cs, or NH$_4$) can be used.

The electrolytes used in the ECDs according to the present invention may also be semi-solid or solid electrolytes with the supporting electrolytes dispersed in agar.

The coloring/bleaching mechanism of Prussian blue can be given by the following equation:

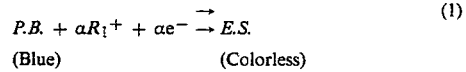

(Blue)   (Colorless)

wherein R$_1$+ is K+, Rb+, Cs+, or NH$_4$+; and E.S. is an Everitt's salt. Supposing that the tungsten-oxalic acid compounds are represented by chemical formula WO$_{3-x}$(C$_2$O$_4$)$_x$, the coloring/bleaching mechanism of the transition metal-oxalic acid compounds can be expressed as follows:

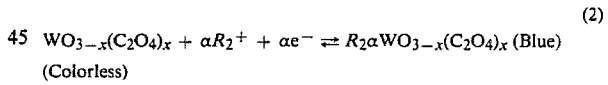

(Colorless)

wherein R$_2$+ is K+, Rb+, Cs+, or NH$_4$+. Thus, the coloring/bleaching mechanism of the ECD according to the present invention will be given as follows:

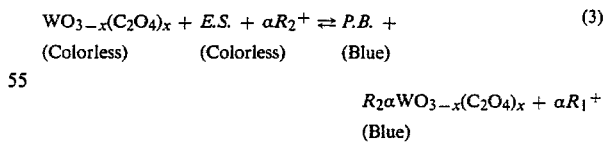

The ECDs according to the present invention are characterized in that various ions such as K+, Rb+, Cs+, or NH$_4$+ can be used in the above reaction. For this reason, the protons or the lithium ions which adversely affect the PB film need not be used, and the life of the ECDs can be prolonged.

With WO$_3$ prepared by the vacuum method, coloring/bleaching cannot be caused by ions such as K+, Rb+, Cs+, or NH$_4$+, while with the tungsten-oxalic acid compounds used in the present invention, coloring- /beaching can be caused by such ions. The reason for this is considered to be due to the fact that oxalic acid coordinating with tungsten forms a wide physical space, which can accommodate or emit $K^+$, $Rb^+$, $Cs^+$, or $NH_4^+$ ion which are larger than the proton or the lithium ion.

As will be demonstrated in Examples below, the ECDs of the present invention provide a synergetic effect better than the combined effect of coloration of the PB films and that of the tungsten-oxalic acid compound films.

This synergetic effect is considered to be attributable to a superposition coloring effect (additivity) of the PB and deposited films, and a low redox potential in the PB and deposited films (tungsten-oxalic acid compound films; $|E| \approx 0.26$ V), and the resultant small activation energy required for coloring/bleaching.

The present invention will be described in detail by way of the following experiments and examples.

Experiment 1

A mixed solution of potassium tungstate and oxalic acid was prepared such that the potassium tungstate concentration was 0.05 mol/l and the oxalic acid concentration was 0.1 mol/l. While the mixed solution was kept at 70° C., two electrodes were dipped in the solution and a current was supplied to the electrodes at a current density of 20 A/m² for 4 hours, for effecting electrolytic reduction with a quantity of electricity 1.5 times the theoretical quantity of electricity required for reducing the potassium tungstate in the solution. After the reduction, the solution was kept at 15° C., and seven tin oxide-coated glass plates [3 mm (thickness)×2.5 cm (width ×5 cm (length)]were dipped in the solution for 18 hours so as to form on the tin oxide coatings the tungsten-oxalic acid compound films each having a thickness of about 800 nm.

Six of seven films obtained were burned at 200° C., 260° C., 280° C., 300° C., 400° C. and 500° C., respectively, for one hour and then cooled. The reflection IR spectra of the resulting films were measured, and the results obtained are shown in FIG. 4.

Figure 4:
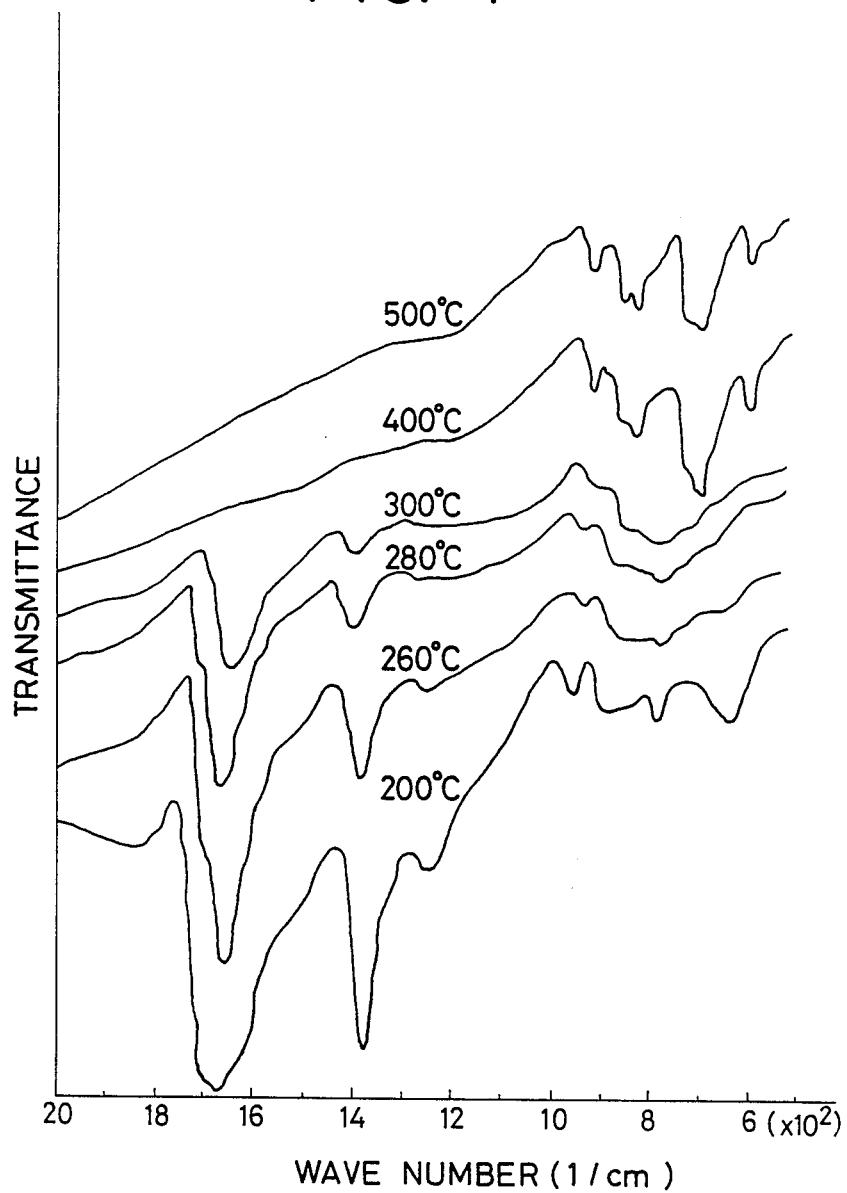
FIGS. 4 and 5 are graphs showing reflection IR characteristics of various EC films prepared in Experiments 1 and 2.

In FIG. 4, the absorption maximum observed near 1,700 cm⁻ is attributed to the stretching vibration of the carbonyl group in oxalic acid coordinating with tungsten. It can be seen from the graph that the absorption intensity decreases with an increase in burning temperature. It will therefore be concluded that oxalic acid in the film is decreased upon burning.

Meanwhile, the weight of oxalic acid coordinating with tungsten in the unburned film was determined by thermo-gravimetric analysis (TGA) and the weights of tungsten in the films were determined by plasma emission spectroscopy (ICP). As a result, it has been found that the amount of oxalic acid coordinating with tungsten is about 48% by weight based on the weight of the tungsten in the film. Similarly, it has been found that for the film burned at 280° C., the amount of oxalic acid coordinating with tungsten was about 17.2% by weight based on the weight of the tungsten in the film, and for the film burned at 200° C. about 27.6%.

Experiment 2

In a similar procedure EC films of one unburned film and eight films burned at 50° C., 100° C., 150° C., 200° C., 220° C., 235° C., 260° C. and 280° C., respectively, (burning time: 30 minutes) were prepared. As a comparative sample, a tungsten oxide film having a thickness of about 200 nm was formed on a tin oxide-coated glass plate as previously described by the magnetron sputtering method at a vacuum pressure of $1 \times 10^{-3}$ Torr and using tungsten as a target.

Figure 5:
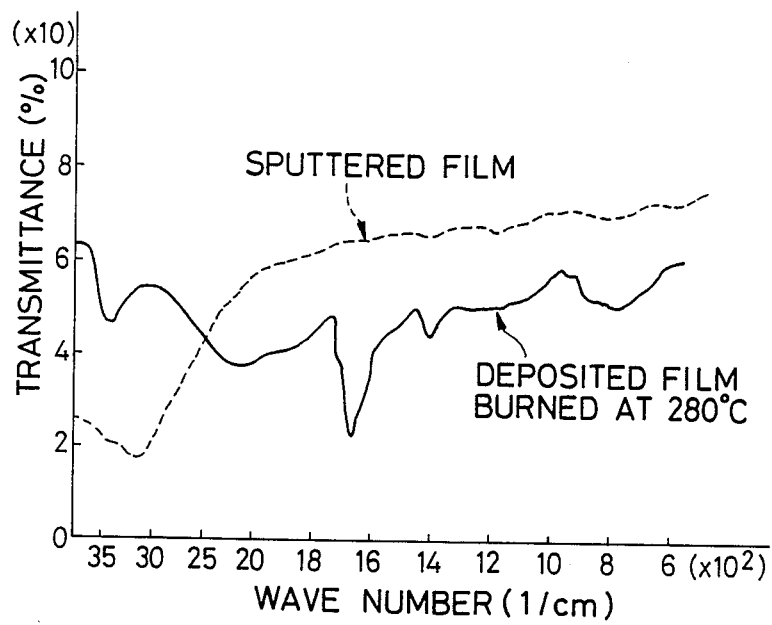

FIG. 5 shows the reflection IR spectra of the film burned at 280° C. and the sputtered film.

Figure 2:
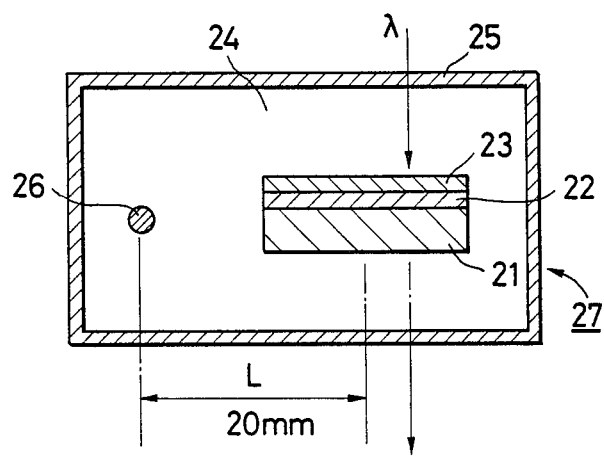
FIG. 2 is a sectional view showing a simplified EC cell used in Experiment 2.

Simplified EC cells as shown in FIG. 2 were prepared using the glass plates provided with nine deposited EC films and the sputtered EC film, respectively. Each simplified EC cell 27 comprises a glass substrate 21, a tin oxide film 22, an EC film 23, an electrolyte 24, a quartz cell 25, and a carbon rod ("Glassy carbon" available from Tokai Carbon K. K., Japan) 26. The electrolyte used was a 3 mol/l KCl aqueous solution. Electrode gap L set in FIG. 2 was 20 mm.

A DC votage was applied to each simplified EC cell such that the film 22 was a negative pole and the carbon rod 26 was a positive pole in the coloring mode and the film 22 was a positive pole and the carbon rod 26 was a negative pole in the bleaching mode. Changes in absorbance (absorbance of a wavelength of 545 nm) with time of each simplified EC cell are measured.

Figure 3:
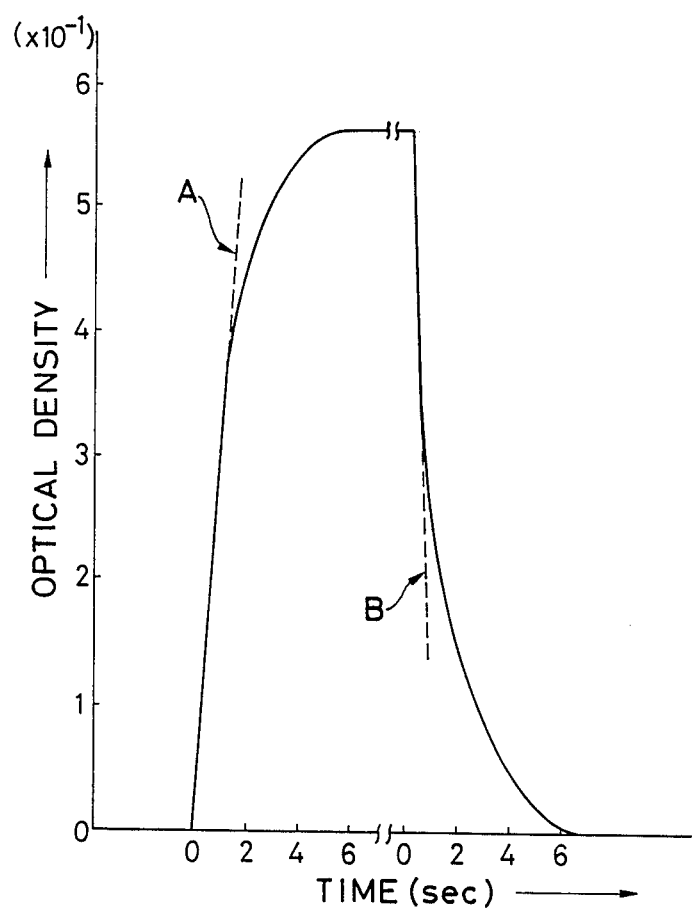
FIG. 3 is a graph showing change in optical density as a function of time of application of a voltage.

The changes in coloring and bleaching degrees with time had characteristic curves as indicated in FIG. 3. In order to evaluate the performance of the ECDs, the initial speeds (slope of curves A and B in FIG. 3) of changes in optical density (Log(Io/I) hereinafter referred to O.D., where Io is the amount of incident light and I is the amount of transmitted light) at the application and reversal of the applied voltage were calculated as follows:

$$\{(dO.D.)/dt\}_{t=0} \text{ and } -\{(dO.D.)/dt\}_{t=0}$$

The respective initial speeds were defined as the coloring and bleaching speeds, and were used in comparative evaluation.

Figure 6:
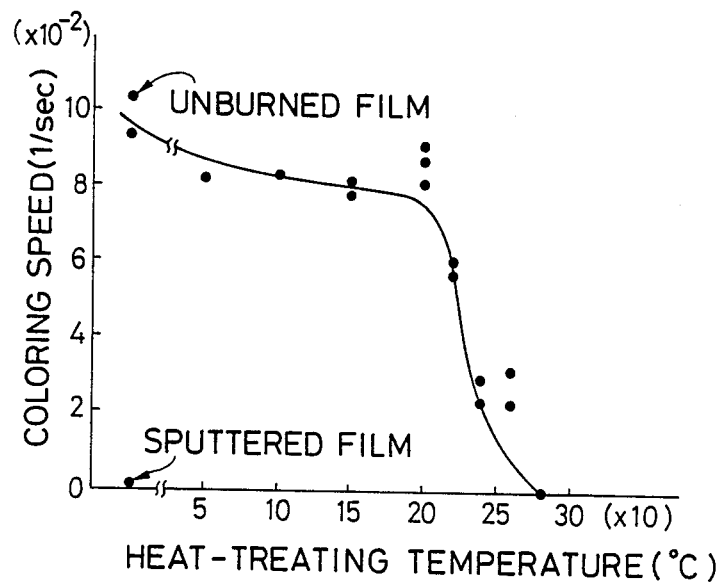
FIG. 6 is a graph showing the coloring speed of EC films formed by the deposition method and the sputtering method in Experiment 2, as a function of the burning temperatures.

FIG. 6 shows the coloring speed as a function of the heat-treating temperature for the ten films used in Experiment 2.

It will be seen from FIG. 6 that the deposited EC films obtained by burning at temperatures of 200° C. or lower have substantially the same coloring speed, and that no coloration occurs in the sputtered EC film and in the film obtained by burning at 280° C.

EXAMPLES (1) Preparation of Reduction Coloring Substances

One tin oxide-coated glass substrate with a tungsten-oxalic acid compound film formed on tin oxide and having a thickness of about 800 nm was prepared as in Experiment 1. Three tin oxide-coated glass substrates with tungsten-oxalic acid compound films formed on tin oxide and having a thickness of about 200 nm were obtained following the same procedure as in Experiment 1 except that the temperature of the solution was set at 20° C. after electrolytic reduction. One tin oxide-coated glass substrate with a tungsten film formed on tin oxide and having a thickness of about 200 nm was formed by the sputtering method following the same procedure as in Experiment 2. One tin oxide-coated glass substrate with a tungsten-oxalic acid film formed on tin oxide and having a thickness of about 200 nm was burned at 280° C. for 1 hour.

(2) Preparation of Oxidation Coloring Substance

A 0.02 mol/l $FeCl_3$ aqueous solution and a 0.02 mol/l $K_3Fe(CN)_6$ aqueous solution were mixed in equal volumes to prepare a mixed solution. A tin oxide-coated glass substrate [3 mm (thickness)×2.5 cm (width)×5 cm (length)]and a platinum plate (5 cm aquare) as a counter electrode, were dipped in the solution. The tin oxide-coated glass substrate was cathodically polarized at a current density of 40 μA/cm² to form a PB film having a thickness of about 200 nm, the PB being represented by the following formula:

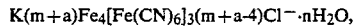

$$K_{(m+a)}Fe_4[Fe(CN)_6]_3(m+a-4)Cl^- \cdot nH_2O,$$

on the substrate. Ten such samples were prepared.

(3) Preparation of ECD

Using various EC films formed in the manner described in (1) above, an SnO₂-coated glass plate, and a 3 mol/l KCl aqueous solution as an electrolyte, six ECDs were manufactured in the following combinations:

(a) PB film (about 200 nm)/deposited tungsten-oxalic acid compound film (about 800 nm);

(b) PB film (about 200 nm)/deposited tungsten-oxalic acid compound film (about 200 nm);

(c) PB film (about 200 nm)/sputtered WO₃ film (about 200 nm thick);

(d) PB film (about 200 nm)/deposited tungsten-oxalic acid compound film burned at 280° C.;

(e) PB film (about 200 nm)/SnO₂ film; and (f) SnO₂ film/deposited tungsten-oxalic acid compound film (about 200 nm).

The structure of each ECD will be described with refrence to FIG. 1, taking the combination (b) as an example.

The ECD prepared in accordance with combination (b) above comprises a reduction coloring substrate 4 consisting of a tungsten-oxalic acid compound film 3 coated on a conductive film 2-on-glass plate 1 and an oxidation coloring substrate 6 consisting of a PB film 5 coated on a conductive film 2-on-glass plate 1, said substrates 4 and 6 being so arranged that the tungsten-oxalic acid compound film 3 and the PB film 5 face each other, and holding spacers 7 and an electrolyte 8 therebetween.

The spacer 7 has a thickness (equivalent to the thickness of the electrolyte 8) of 3 mm and has a display area of 3 cm².

To each ECD so prepared was applied a DC voltage within a range of ±0.5 to ±2.0 V, and change in absorbance at the wavelength of 632.8 nm were measured.

Figure 7:
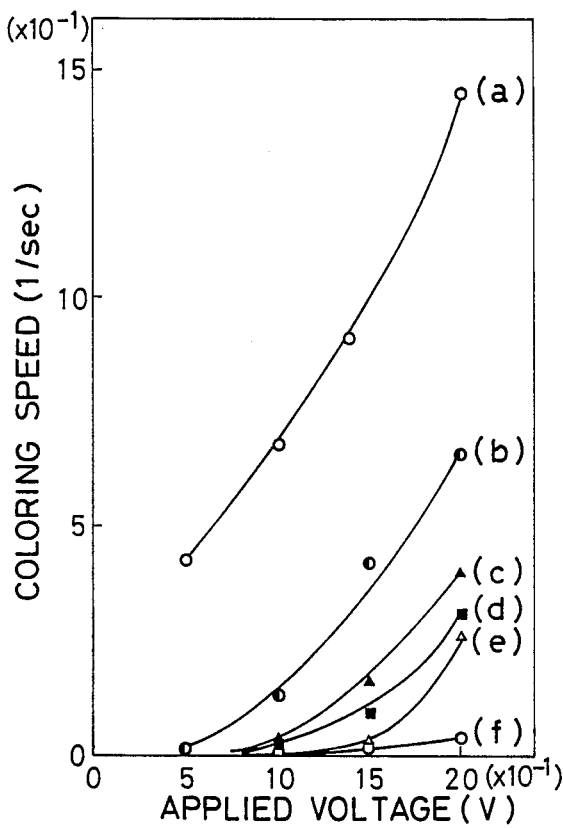
FIGS. 7 and 8 are graphs showing coloring and bleaching speeds, respectively, as a function of the applied voltages for various ECDs obtained in Examples.
Figure 8:
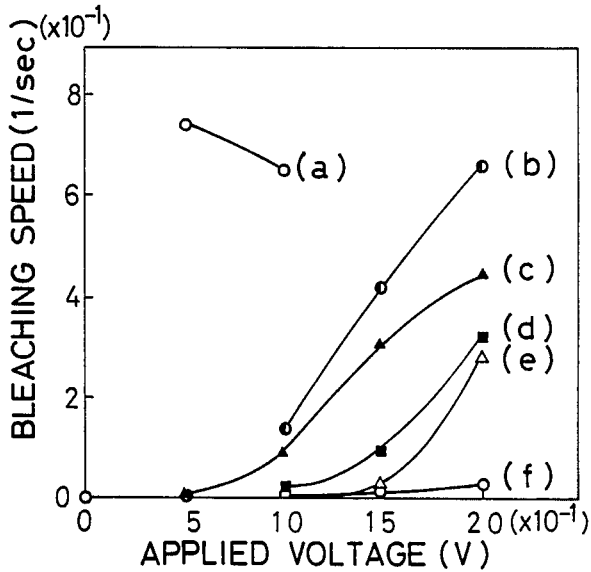

FIGS. 7 and 8 show the coloring and bleaching speeds as a function of the voltage applied to each ECD.

It can be seen from FIGS. 7 and 8 that, in the PB/tungsten-oxalic acid compound film ECDs {(a) and (b)}, the response time is shorter than that for a PB film alone or for a tungsten-oxalic acid compound film alone (counter electrode: SnO₂), and that with a sputtered WO₃ film and with a deposited tungsten-oxalic acid compound film burned at 280° C. a response time shorter than that obtained by additive effect cannot be obtained using an electrolyte containing only K⁺. On the contrary, the speed of response is increased synergically using an electrolyte containing only K⁺ ions for a combination of an unbured, deposited tungsten oxide film and a PB film. Further, it well be seen that the response time can be greatly shortened by suitably selecting the thickness of the tungsten oxide film (e.g., 800 nm).

An ECD using an electrolyte containing K⁺ ions and using a combination of an unburned deposited film and a PB film can operate at a low voltage of 0.5 V and has a distinct color tone and also a memory function. The fact that the ECD can operate at a low voltage of 0.5 V is an advantage that the power consumption is lower than that of ECD using a PB film alone which requires an applied voltage of 1.5 V or more.

What is claimed is:

1. An electrochromic device comprising an oxidation coloring substance coloring in an oxidized state and a reduction coloring substance coloring in a reduced state which are formed on the surfaces of a pair of electrodes, respectively, and an electrolyte held between the oxidation and reduction coloring substances, wherein the oxidation coloring substance is a double salt containing an iron hexacyanoferrate and the reduction coloring substance is a tungsten-oxalic acid compound.

2. An electrochromic devide according to claim 1, wherein the tungsten-oxalic acid compound contains oxalic acid coordinating with tungsten, the weight of said oxalic acid being 0.172 to 0.48 times the weight of the tungsten in the tungsten-oxalic acid compound.

3. An electrochromic device according to claim 1 or 2, wherein the electrolyte contains at least one cation species selected from the group consisting of potassium ion, rubidium ion, cesium ion and ammonium ion.

* * * * *